May 21, 1935.  W. M. SHEEHAN  2,001,751
VEHICLE
Filed June 25, 1932   2 Sheets-Sheet 2
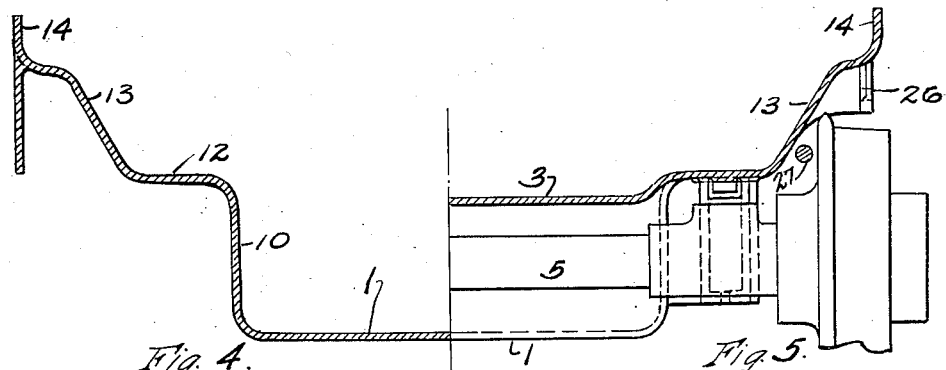
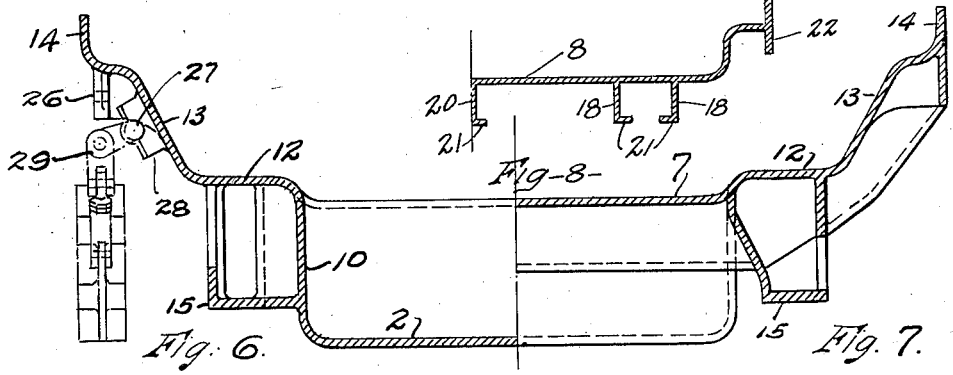
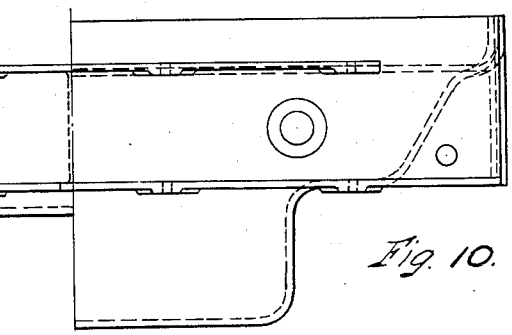
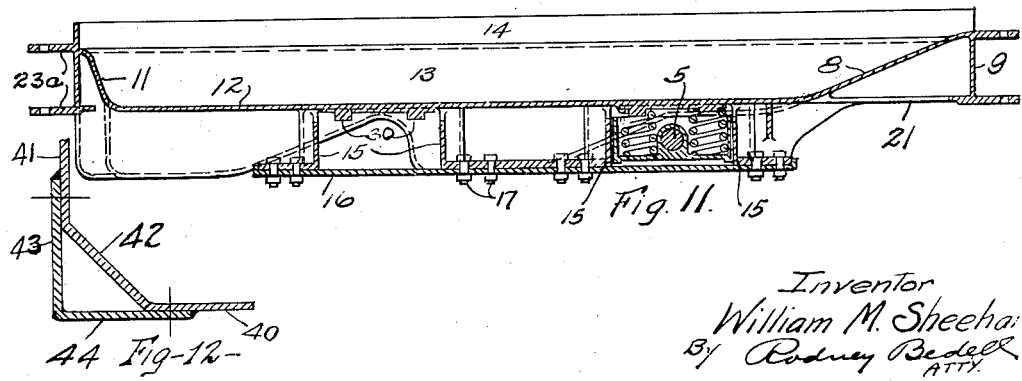
Inventor
William M. Sheehan
By Rodney Bedell
ATTY.

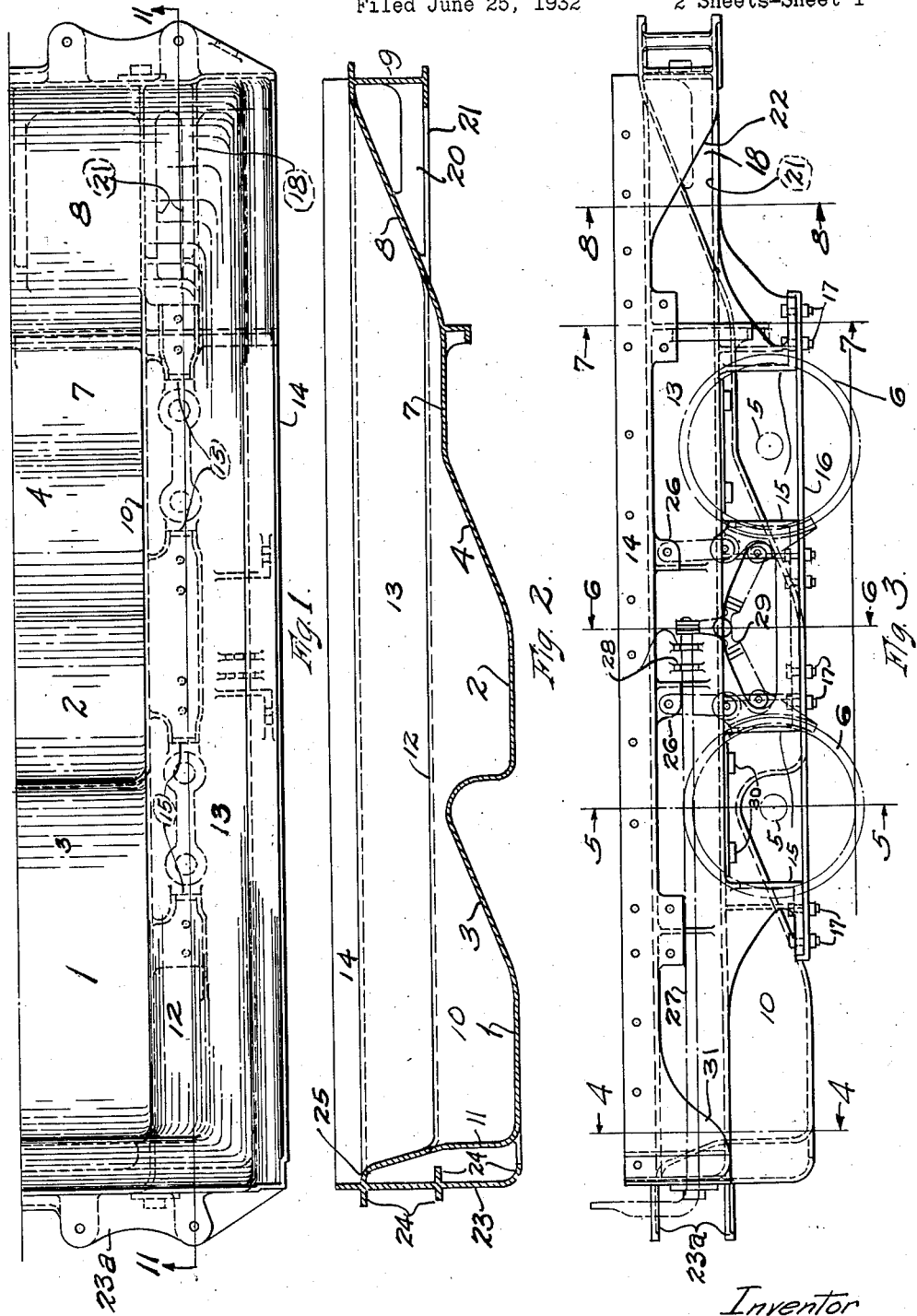

Patented May 21, 1935

2,001,751

UNITED STATES PATENT OFFICE 2,001,751

VEHICLE

William M. Sheehan, Merion, Pa., assignor to General Steel Castings Corporation, Granite City, Ill., a corporation of Delaware Application June 25, 1932, Serial No. 619,226

18 Claims. (Cl. 105—364)

The invention relates to vehicles used in mines, quarries, and in similar service, particularly where the vehicle is tilted longitudinally to discharge its contents through one end of the vehicle.

The main object of the invention is to increase the capacity of such a vehicle without unduly increasing the length, width, or height of the same.

Another object of the invention is to provide a compact rigid structure which will withstand the destructive forces arising from the hard use to which such vehicles are subjected without unduly increasing the weight or cost of the vehicle.

Another object of the invention is to avoid destructive forces arising from accumulation of dirt, moisture, and so forth, in crevices in the vehicle walls, which accumulation promotes corrosion and the resulting weakening of the structure and leakage of material carried thereby.

Another object of the invention is to provide novel axle journal mounted structure particularly arranged for the location of wheels outside of the axle housing.

Other detail objects will be apparent from the following description, and reference is made to applicant's co-pending application Serial No. 616,673, filed June 11, 1932, and the vehicle illustrated in the accompanying drawings utilizes features covered by said application.

The accompanying drawings illustrate a coal mine car, but it will be understood that the car, as shown, may be utilized for other services and many of the features of the car may be embodied in vehicles of substantially different size and design. In these drawings—

Figure 1 is a top view of one longitudinal half of a car underframe and lower body portion.

Figure 2 is a vertical section on the longitudinal center line of the car.

Figure 3 is a side elevation of the structure shown in Figures 1 and 2 and also illustrating associated wheels and brake rigging.

Figures 4 to 8, inclusive, are vertical transverse sections on the corresponding section lines of Figure 3.

Figure 9 is a half end elevation of the right-hand end of the structure shown in Figures 1 to 3.

Figure 10 is a half end view of the left-hand end of the same structure.

Figure 11 is a vertical longitudinal section taken on the line 11—11 of Figure 1.

Figure 12 is a cross section through a modified end sill structure.

The car underframe and lower body portion is shown as being of a single piece of metal, preferably a casting, and embodies a floor structure including a central part having portions 1 and 2, disposed in close proximity to the vehicle track; portions 3 and 4 inclined upwardly from portions 1 and 2, respectively, to accommodate the axles 5 on which the vehicle wheels 6 are mounted; a horizontal portion 7; and an upwardly inclined portion 8 extending to the level of the top of the right-hand end sill 9. At the sides of this central floor part are upright webs 10 extending in part throughout most of the length of the car. A horizontal floor section 12 extends outwardly from each web 10 and merges with an outwardly and upwardly inclined section 13 which terminates in an upright flange 14 to which the car upper side wall (not shown) may be secured.

Pedestal elements 15 for mounting the axle journal boxes (not shown) depend from floor sections 12 and project outwardly from web 10. These elements on opposite sides of the car are braced transversely of the car by the central floor structure, and these pedestal elements are also braced longitudinally of the car by the continuous web 10 and also by a tie bar 16 which extends along the lower ends of the pedestal legs and is bolted to the latter, as shown at 17.

This pedestal and floor structure provides a rigid mounting of the wheels and axles, resisting racking and twisting of the car, loosening of the car parts from each other, and the frequent repairs attendant upon such results arising from the ordinary structure of cars used in this type of service. At the right-hand end of the car, the outer face of the adjacent pedestal is continued to the end sill 9 in the form of a relatively shallow element 18, and a similar element 20 extends between floor portion 8 and end sill 9 in alinement with wall 10. Flanges 21 on elements 18 and 20 cooperate with the latter and with floor section 8 to form a box-like girder between the end sill 9 and the nearest pedestal and the floor portions 7 and 8 adjacent to the latter. This arrangement utilizes the entire floor structure as a buffing member for the car, making possible a lighter end sill than would be otherwise required. End sill 9 is further braced and reinforced by the diagonal gusset-like element 22 depending from the side flange 14.

The end sill at the opposite end of the car is designed to be engaged by a car moving device such as an upstanding arm on a chain or cable moving in the car trackway. This end sill forms a box-like structure including the spaced walls 11 and 23 provided with suitable flanges 24. Walls 11 and 23 are substantially parallel at their lower portions but converge and merge at 25. The lower portion of wall 11 extends between longitudinal webs 10, and the upper portion of wall 11 extends between floor sections 13 and is inclined outwardly, taking the place of an end sill horizontal upper wall and increasing the car capacity somewhat, and serving to brace the outer wall 23 to better resist buffing and pulling forces applied thereto by mechanism (not shown) mounted between the webs 23a.

The inclined floor section 13 provides a space between the vertical plane of the side of the car and the horizontal plane of the floor section 12 in which the brake hanger brackets 26, the brake operating shaft 27 and bearings 28 therefor, and a portion of the toggle brake mechanism 29 may be mounted without projecting beyond the clearance limits of the vehicle. Preferably, brackets 26, bearings 28, spring seating pads 30 gussets 22, and a corresponding gusset 31 at the other end of the car, are all integral parts of the cast underframe and lower body structure whereby numerous rivets and bolts are eliminated and the labor of attaching and frequent tightening of attached parts is avoided.

The use of a one-piece casting for the underframe and lower body structure provides a seamless imperforate floor structure as disclosed in applicant's co-pending application Serial No. 594,687, filed February 23, 1932, thereby facilitating the passage of material over the floor surfaces when the car is tilted to discharge its load through the open door provided at the right-hand end of the car. All of the wall surfaces merge in arcuate portions of substantial radii, which tends to eliminate packing of the material as results from sharp corners. The shape given the floor section substantially increases the capacity of the car over previous vehicles of corresponding length, width and depth, and it will be realized that this is a material advantage as the efficiency of the mining operation is greatly increased by a decrease in the number of carloads necessary to transport the coal from the working chambers.

Figure 12 illustrates a modified end sill structure in which the horizontal floor section 40 and upright end sill wall 41 terminate a substantial distance from each other and are connected by an integral diagonal web 42, and a separately formed plate bent at right angles is applied to the exterior of the cast structure with its upright leg 43 overlapping and secured to end sill wall 41, and its horizontal leg 44 overlapping and secured to the floor section 40. The two parts may be secured together by welds or rivets, or both, and provides an end sill of hollow triangular section well adapted to resist the buffing and car moving forces applied thereto, but obviously the structure provides for a simpler mold and is an easier casting proposition than the sill structure sectioned in Figure 2.

Various details of the vehicle illustrated in the drawings may be modified in accordance with the disclosures in the above-mentioned co-pending applications, and also in accordance with the disclosure in applicant's co-pending application Serial No. 622,927, filed July 16, 1932, and other modifications in the structure may be made without departing from the spirit of the invention. Exclusive use of all modifications coming within the scope of the claims is contemplated.

What is claimed is:

1. In a vehicle of the class described, an axle, wheels mounted thereon on opposite sides of the vehicle, a continuous web forming the main elements of the vehicle underframe and also forming a seamless floor having a lower part between said wheels and below the level of the tops thereof, said floor including a portion inclined upwardly from said lower part longitudinally of the vehicle to facilitate the discharge of the vehicle load through the end of the vehicle when the vehicle is tilted longitudinally there being axle mounted structure at the sides of said floor lower part, and floor portions extending upwardly from said floor lower part and outwardly over said axle mounted structure and at substantially the same level from end to end of the vehicle.

2. In a vehicle of the class described, an axle and wheels, a continuous web forming the main elements of the vehicle underframe and also forming a seamless floor having a lower part below the level of said axle and having a portion sloping gradually upwardly from said lower part towards an end of the vehicle and over said axle to facilitate the discharge of the load from the vehicle when the same is tilted longitudinally.

3. In a vehicle of the class described, end sills and a floor forming the main underframe structure having a central panel extending inwardly and downwardly abruptly from the top of one end sill, to a level in close proximity to the vehicle track, and then longitudinally of the vehicle in a substantially horizontal plane, then inclined upwardly to clear a vehicle axle, then downwardly to said level and then upwardly to clear another vehicle axle, and then inclined gradually outwardly and upwardly to the top of the other end sill to facilitate the discharge of the vehicle load when the vehicle is tilted longitudinally, said floor including side portions extending outwardly from said central panel to form underframe structure substantially as wide as the vehicle body.

4. In a vehicle of the class described, wheels and axles, a floor having a central part which is mostly below the level of said axles, said floor having an outwardly extending side part located at a higher level than said central part, there being an upright web between said central and side parts, and structure projecting outwardly from said web to receive and position a relatively movable axle box, said structure being united with said side part and bracing the same across the corner between it and said web.

5. In a vehicle of the class described, wheels and axles, a floor having a central part which is mostly below the level of said axles but includes a portion inclined upwardly longitudinally of the vehicle and extending over one of said axles to facilitate the discharge of the carload when the car is tilted longitudinally, said floor having a side part extending outwardly and located at a higher level than said central part, and an axle box mounting structure depending from said side part and united with and extending alongside of and projecting below the level of said inclined portion of the floor.

6. In a vehicle of the class described, an axle, wheels thereon at opposite sides of the vehicle, a floor having portions extending above the level of the axle journals, journal box receiving pedestals depending from said floor portions, and a floor part between said wheels and below the level of said axles and bracing said pedestals transversely of the vehicle.

7. In a vehicle of the class described, spaced axles, wheels thereon, a floor having a side portion extending over the axle journals, journal box receiving pedestals depending from said floor portion at intervals along the side of the vehicle, said floor having a central part below the level of said side portion and bracing said axle mounting structures longitudinally of the vehicle.

8. In a vehicle of the class described, wheels located substantially flush with the sides of the vehicle, an axle therefor, and a continuous web forming a seamless floor including a central portion between said wheels, located at a lower level than said axle, said floor having a side portion extending outwardly from and at a higher level than said central portion to carry axle journal mounting structure, and then inclined upwardly and outwardly to the side of the vehicle, said side portion being free of reentrant pockets adjacent the side of the vehicle.

9. In combination, a vehicle floor, wheel and axle arrangement as specified in claim 8, and brake rigging mounting structure on the outwardly and upwardly inclined portion of the floor for mounting brake rigging located inwardly of the plane of the vehicle side wall.

10. In a vehicle of the class described, a floor with a central portion disposed in close proximity to the vehicle track and extending longitudinally of the vehicle to a point near one end of the vehicle, said floor having elevated horizontal side portions, there being upright webs between said central and side portions, and upwardly and outwardly inclined extensions of said elevated portions, an end sill having a lower portion extending between said upright webs and an upper portion extending between the inclined extensions of said floor.

11. In a vehicle of the class described, a floor with a central portion, located at a level in close proximity to the vehicle track, and a side portion extending laterally at a higher level, an end sill comprising in its lower part an inner web extending upright from the end of said floor lower portion to the level of said floor higher portion and then being inclined forwardly, said end sill also including an outer vertical web spaced from the lower part of said inner web and merging with the upper edge thereof.

12. In a vehicle of the class described, an end sill, a floor central portion disposed in close proximity to the vehicle track with its end portion inclined upwardly and outwardly to clear said end sill, a floor side portion located at a higher level than said central portion, a longitudinal upright web between said floor portions and extending below said inclined portion to said sill, an axle journal mounted structure including a side wall spaced from said web with an extension to said end sill, and opposed flanges on the lower edges of said web and wall, said web, wall, flanges and floor central inclined portion forming a box girder from said end sill to said axle mounted structure.

13. In a vehicle of the class described, a floor member, an upright end sill member, a diagonal web connecting said members, and a plate bent at right angles with its upright portion overlapping and secured to said end sill member and with its horizontal portion overlapping and secured to said floor member.

14. In a vehicle of the class described, an upright end sill member, a floor member spaced therefrom, a diagonal web connecting said floor member and the upper portion of said end sill member, and a reinforcing plate spaced from said diagonal web and secured to said end sill and floor member.

15. In a vehicle of the class described, a wheel and an axle, and a continuous web forming a seamless floor and the main underframe structure and including an end sill member for a buffing element mounted thereon above the level of said axle, a floor lower part below the level of said axle and a floor portion extending gradually upwardly from said lower part to said sill member above said element to facilitate the discharge of the vehicle load when the vehicle is tilted longitudinally.

16. A structure as specified in claim 15 in which the underframe forming web also includes and is reinforced by axle mounting structure at the sides of said floor lower part and also includes and is strengthened by floor portions extending upwardly and outwardly over said axle mounting structure.

17. In a vehicle of the class described, wheels and axles, a floor forming web having transversely and upwardly extending portions, structure united with said portions and constituting a brace between them and including elements spaced longitudinally of the vehicle, and an axle box between and positioned by said elements.

18. In a vehicle of the class described, wheels and axles, a floor having a central part which is mostly below the level of said axles, said floor having an outwardly extending side part located at a higher level than said central part, there being an upright web between said central and side parts, and axle box mounting structure projecting outwardly from said web and comprising pedestals for receiving a journal box between them and forming bracing between said web and side part.

WILLIAM M. SHEEHAN.